United States Patent
Goldman et al.

(10) Patent No.: US 11,789,475 B2
(45) Date of Patent: *Oct. 17, 2023

(54) SYSTEMS AND METHODS OF CREATING CERTAIN WATER CONDITIONS IN SWIMMING POOLS OR SPAS

(71) Applicant: ZODIAC POOL SYSTEMS LLC, Carlsbad, CA (US)

(72) Inventors: David Goldman, Carlsbad, CA (US); Tracy Hanson, Carlsbad, CA (US); Jeff Holmquist, Carlsbad, CA (US)

(73) Assignee: ZODIAC POOL SYSTEMS LLC, Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/950,082

(22) Filed: Sep. 21, 2022

(65) Prior Publication Data
US 2023/0018961 A1 Jan. 19, 2023

Related U.S. Application Data

(63) Continuation of application No. 16/816,703, filed on Mar. 12, 2020, now Pat. No. 11,493,942.
(Continued)

(51) Int. Cl.
*G05D 23/19* (2006.01)
*E04H 4/12* (2006.01)
*G05B 13/04* (2006.01)

(52) U.S. Cl.
CPC ......... *G05D 23/1917* (2013.01); *E04H 4/129* (2013.01); *G05B 13/048* (2013.01); *G05D 23/1951* (2013.01)

(58) Field of Classification Search
USPC ........................................................ 700/300
See application file for complete search history.

(56) References Cited

U.S. PATENT DOCUMENTS

| 6,965,815 B1 | 11/2005 | Tompkins et al. |
| 7,043,341 B2 * | 5/2006 | Gallupe .................. E04H 4/129 700/282 |

(Continued)

FOREIGN PATENT DOCUMENTS

| EP | 1999833 B1 | 5/2015 |
| WO | 2004061372 A2 | 7/2004 |

OTHER PUBLICATIONS

International Application No. PCT/US2020/022287, International Preliminary Report on Patentability dated Oct. 28, 2021, 7 pages, printed copy with parent case: U.S. Appl. No. 16/816,703.
(Continued)

*Primary Examiner* — Hien D Khuu
(74) *Attorney, Agent, or Firm* — Kilpatrick Townsend & Stockton LLP

(57) ABSTRACT

"Just in time" operational techniques allow equipment of swimming pools or spas to achieve identified water temperatures at specified times. A user may supply information such as a desired water temperature (i.e. a temperature set point) and a time at which the water is desired to be at the desired temperature. After receiving the user-supplied information, software may account as well for certain environmental conditions to devise a suitable schedule for controlling heating of the water of the swimming pool or spa. Adjustments may be made to the schedule based on then-current water temperatures or other changed conditions.

8 Claims, 1 Drawing Sheet

Related U.S. Application Data

(60) Provisional application No. 62/835,938, filed on Apr. 18, 2019.

(56) References Cited

U.S. PATENT DOCUMENTS

| | | | |
|---|---|---|---|
| 8,370,001 B2* | 2/2013 | Love | G05D 23/19 |
| | | | 700/282 |
| 8,649,908 B2 | 2/2014 | Nibler et al. | |
| 11,493,942 B2 | 11/2022 | Goldman et al. | |
| 2004/0230344 A1 | 11/2004 | Gallupe et al. | |
| 2007/0180607 A1 | 8/2007 | Pickrell et al. | |
| 2007/0241098 A1 | 10/2007 | Graham et al. | |
| 2009/0204263 A1 | 8/2009 | Love | |
| 2017/0268800 A1 | 9/2017 | Hayden et al. | |
| 2018/0240322 A1 | 8/2018 | Potucek et al. | |

OTHER PUBLICATIONS

International Application No. PCT/US2020/022287, International Search Report and Written Opinion dated Jul. 1, 2020, 10 pages, printed copy with parent case: U.S. Appl. No. 16/816,703.

U.S. Appl. No. 16/816,703, Advisory Action dated Apr. 26, 2022, 2 pages.

U.S. Appl. No. 16/816,703, Final Office Action dated Feb. 17, 2022, 13 pages.

U.S. Appl. No. 16/816,703, Non-Final Office Action dated Sep. 2, 2021, 11 pages.

U.S. Appl. No. 16/816,703, Notice of Allowance dated Jul. 11, 2022, 11 pages.

European Application No. 20716664.6, Office Action dated Jun. 1, 2023, 4 pages.

* cited by examiner

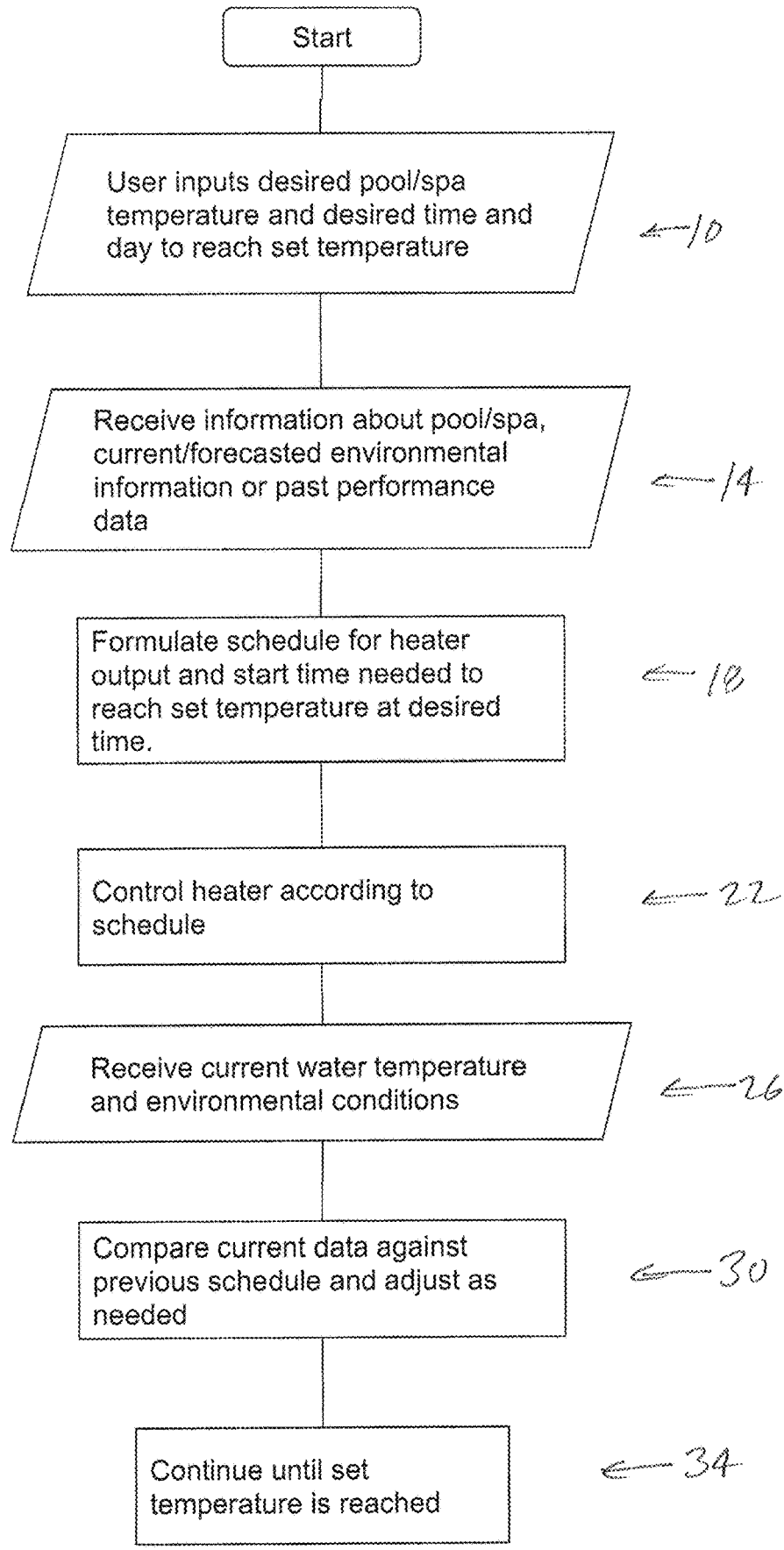

SYSTEMS AND METHODS OF CREATING CERTAIN WATER CONDITIONS IN SWIMMING POOLS OR SPAS

CROSS-REFERENCE TO RELATED APPLICATIONS

This application is a continuation of U.S. patent application Ser. No. 16/816,703, filed Mar. 12, 2020 and entitled SYSTEMS AND METHODS OF CREATING CERTAIN WATER CONDITIONS IN SWIMMING POOLS OR SPAS, which claims the benefit of and priority to U.S. Provisional Patent Application Ser. No. 62/835,938, filed Apr. 18, 2019 and entitled SYSTEMS AND METHODS OF CREATING CERTAIN WATER CONDITIONS IN SWIMMING POOLS OR SPAS, both of which are hereby incorporated herein reference in their entireties.

FIELD OF THE INVENTION

This invention relates to controlling equipment of swimming pools and spas and more particularly, although not necessarily exclusively, to systems and methods which allow homeowners or other users to identify desired water temperatures at specified future times and then control heaters or other equipment of the users' pools or spas so as to achieve the identified water temperatures at the specified times.

BACKGROUND OF THE INVENTION

Many pool and spa users plan use of their vessels—at least to some extent—and thus can identify certain future times at which they desire water temperatures to reach certain values. As a simple example, a homeowner may intend to receive guests at 3:00 pm on July 12th and plan to offer the guests an opportunity to swim in the homeowner's pool. Accordingly, the homeowner may desire that water temperature within the pool be, e.g., 80° F. by 3:00 pm on July 12th in order to provide a comfortable environment for the guests to swim.

Rarely, however, do homeowners know when, and under what conditions, to operate their pool heaters to achieve their desired results. Consequently, some homeowners may commence operation of the heaters prematurely or cause the heaters to operate at higher than needed power levels. Although proceeding in this manner may allow the pool water timely to reach the desired temperature, it wastes energy by either overheating the water or heating the water unnecessarily prior to the specified time. Alternatively, some homeowners may commence operation of the heaters late or operate them at lower than needed power levels, preventing the water from reaching the desired temperature at the specified time. Both approaches are typically based more on guesses made by homeowners than on any scientific principles.

Recognized by commonly-owned U.S. Pat. No. 8,649,908 to Nibler, et al., is that different environmental conditions may exist at different geographic locations. Similarly, different environmental conditions may exist at different times even at the same geographic location. Programmable controllers configured to operate pool systems thus "may include automatic adjustment of the operating parameters of the systems so that the time of year and/or geography may be taken into account." See Nibler, col. 4, ll. 1-3. In one example described in the Nibler patent, "the controller may access a lookup table of values corresponding to known sunrise and sunset times for the user's location to adjust the on and off times [of a pool lighting system] as the year progresses." See id., col. 6, ll. 5-8. In another example, information as to geographic location of a pool may allow adjustment of the water fill line of the pool to account for, e.g., evaporation rate. See id., ll. 34-44.

BRIEF DESCRIPTION OF THE DRAWING

The FIGURE illustrates an exemplary set of actions that may occur in connection with the invention.

DESCRIPTION OF THE INVENTION

Scientific principles such as those contemplated in the Nibler patent may (but need not necessarily) be useful in connection with the present invention. For a user seeking to heat pool water to a particular temperature at a particular time, additionally useful may be historical and current weather data as well as weather forecasts. Optionally included among the data may be air temperature and precipitation information, for example, as each may contribute to assessing when and how to operate the pool heater.

Information relating to past performance of the pool heater, circulation pump, or other pool equipment further may be valuable. Similarly, any available prediction relating to future performance of the pool heater or other equipment may be valuable. Combined, some or all of the data and information may be employed to model or estimate suitable heater start and stop times and conditions under which the pool heater may be operated in order timely to achieve desired temperature results while reducing the likelihood (or amount) of energy waste.

Information, logic, algorithms, and models may be stored locally or remotely and may be accessible directly or via a network such as the Internet. In some embodiments of the invention, software programs ("apps") may be executed on user devices such as—but not limited to—portable smartphones, tablets, laptop computers, or desktop computers. An app may receive, as input, information provided by a user such as a desired water temperature (i.e. a temperature set point) and a time at which the water is desired to be at the desired temperature. (The desired time information also may reflect a duration over which the specified water temperature is desired.)

After receiving the user-supplied information, the app may take into account some or all of the information and data described above and devise a "just in time" or other operational approach to achieve the user-desired result. The operational approach may, for example, include determination of when to commence heating of the pool water as well as settings of the heater, pump, etc., to utilize while operating. Heating cycle (on/off) times may be created as well.

Additionally determinable may be how to utilize multiple devices to heat the pool water. For example, a particular pool may include both a heat pump and a gas heater. If so, and because heating performance (particularly for the heat pump) is impacted by temperature and humidity, either or both of current or predicted weather may be considered in assessing whether, when, and for what time periods to activate each of the heat pump and gas heater. Similarly, if a particular pool includes a gas heater and solar heating also is available, the operational approach devised by the app may account for the facts that using the solar heating will consume less energy but that solar power may require a longer time period for the pool water to reach the temperature set point.

One envisioned operational approach intends to achieve the user-desired result while minimizing overall energy usage by the water heater, if not by other pool equipment too. Regardless, the determined operational approach may be conveyed, by wire or wirelessly, to a controller of the relevant pool equipment to operate the heater, pump, or other equipment accordingly.

The FIGURE depicts an example of various actions consistent with the invention. As indicated in block 10, a user may supply to the app (or otherwise) information such as a desired water temperature for a pool or spa and a desired time and time for the water of the pool or spa to reach the desired temperature. Additional information also may be supplied, with block 14 identifying current/forecasted environmental information or past performance data, as examples. The app, or associated software or hardware, may use the supplied information to formulate a schedule for a heater so as to reach the set temperature at the desired time, as identified in block 18. The heater may be controlled according to the formulated schedule (see block 22). Blocks 26-34 depict the possibility of creating a feedback loop by receiving current water temperature and environmental conditions (block 26), comparing the current data with the data used to formulate the schedule and adjusting the schedule if necessary to account for discrepancies between the data sets (block 30), and continuing to control the heater according to the adjusted schedule (block 34).

Methods consistent with the present invention include, but are not limited to:

Statement 1. A method of operating equipment of a water-circulation system of a swimming pool or spa, comprising:
  a. receiving information as to a desired temperature of water within the swimming pool or spa and a desired time at which the water is desired to be at the desired temperature;
  b. assessing the received information together with other information; and
  c. controlling the equipment based on the assessment in an attempt to cause the water to reach the desired temperature at the desired time.

Statement 2. A method according to statement 1 in which the received information is input by a user of the swimming pool or spa into a user device.

Statement 3. A method according to statement 1 or 2 in which the other information comprises at least one of: (a) current air temperature at the geographic location of the swimming pool or spa, (b) current precipitation status at the geographic location of the swimming pool or spa, (c) historical weather data at the geographic location of the swimming pool or spa, (d) past performance of the equipment, or (e) a prediction as to future performance of the equipment.

Statement 4. A method of operating equipment of a water-circulation system of a swimming pool or spa, comprising:
  a. receiving information as to a desired temperature of water within the swimming pool or spa and a desired time or timeframe at which the water is desired to be at the desired temperature;
  b. accessing additional information related to energy usage of the equipment;
  c. modeling performance of the equipment based on the desired temperature, the desired time, and the additional information related to energy usage;
  d. determining, based on the modeled performance, (i) a heating commencement time to commence heating of the pool, where the heating commencement time is before the desired time or time frame, and (ii) equipment operation settings while operating;
  e. generating a schedule for operating the equipment before the desired time or time frame, the generated schedule comprising the heating commencement time and the equipment operation settings; and
  f. controlling the equipment pursuant to the generated schedule to commence heating at the heating commencement time and to operate pursuant to the equipment operation settings from the heating commencement time to the desired time or timeframe control a temperature of the water in an attempt to cause the water to reach the desired temperature at the desired time or timeframe.

Statement 5. A method of operating equipment of a water-circulation system of a swimming pool or spa, comprising:
  a. receiving information as to a desired temperature of water within the swimming pool or spa and a desired time or timeframe at which the water is desired to be at the desired temperature;
  b. accessing additional information related to historical weather data for a geographic location of the swimming pool or spa, current weather data for the geographic location of the swimming pool or spa, and weather forecasts for the geographic location of the swimming pool or spa;
  c. modeling performance of the equipment based on the desired temperature, the desired time, and the additional information;
  d. determining, based on the modeled performance, (i) a heating commencement time to commence heating of the pool, where the heating commencement time is before the desired time or time frame, and (ii) equipment operation settings while operating;
  e. generating a schedule for operating the equipment before the desired time or time frame, the generated schedule comprising the heating commencement time and the equipment operation settings; and
  f. controlling the equipment pursuant to the generated schedule to commence heating at the heating commencement time and to operate pursuant to the equipment operation settings from the heating commencement time to the desired time or timeframe control a temperature of the water in an attempt to cause the water to reach the desired temperature at the desired time or timeframe.

These examples are not intended to be mutually exclusive, exhaustive, or restrictive in any way, and the invention is not limited to these example embodiments or methods but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Nibler patent are incorporated herein by this reference. Also incorporated herein by this reference are the entire contents of U.S. Patent Application Publication No. 2018/0240322 of Potucek, et al., which discloses (among other things) various equipment of exemplary water-circulation systems of swimming pools and spas. Further, although applicant has described devices and techniques for use principally with swimming pools, persons skilled in the relevant field will recognize that the present invention may be employed in connection with other objects and in other manners. Finally, references to "pools" and "swimming pools" herein may also refer to spas or other water containing vessels used for recreation or therapy.

What is claimed is:

1. A method of operating equipment of a water-circulation system of a swimming pool or spa, comprising:
   a. receiving information as to a desired temperature of water within the swimming pool or spa and a desired time or timeframe at which the water is desired to be at the desired temperature;
   b. accessing additional information related to energy usage of the equipment;
   c. modeling performance of the equipment based on the desired temperature, the desired time, and the additional information related to energy usage;
   d. determining, based on the modeled performance, (i) a heating commencement time to commence heating of the pool, where the heating commencement time is before the desired time or time frame, and (ii) equipment operation settings while operating;
   e. generating a schedule for operating the equipment before the desired time or time frame, the generated schedule comprising the heating commencement time and the equipment operation settings; and
   f. controlling the equipment pursuant to the generated schedule to commence heating at the heating commencement time and to operate pursuant to the equipment operation settings from the heating commencement time to the desired time or timeframe control a temperature of the water in an attempt to cause the water to reach the desired temperature at the desired time or timeframe.

2. The method according to claim 1, wherein receiving information comprises receiving information from a user device.

3. The method according to claim 2, wherein the user device is remote from the water-circulation system, and receiving information comprises receiving information from the remote user device.

4. The method according to claim 1, wherein accessing additional information further comprises accessing at least one of: (a) current air temperature at a geographic location of the swimming pool or spa, (b) current precipitation status at the geographic location of the swimming pool or spa, (c) historical weather data at the geographic location of the swimming pool or spa, (d) past performance of the equipment, or (e) a prediction as to future performance of the equipment.

5. The method according to claim 1, further comprising:
   receiving current information as to a then-current temperature of water within the swimming pool or spa;
   reassessing the received information and the additional information together with the current information comprising the then-current temperature of water within the swimming pool or spa and generating an updated schedule; and
   controlling the equipment pursuant to the generated updated schedule to control the temperature of the water in an updated attempt to cause the water to reach the desired temperature at the desired time or timeframe.

6. The method according to claim 1, wherein the equipment comprises different first and second heating means and wherein controlling the equipment comprises determining whether, when, and for what time period to activate each of the first and second heating means.

7. The method according to claim 1, wherein modeling performance of the equipment comprises modeling a plurality of heating commencement times and a plurality of equipment operation settings while operating, and
   wherein the heating commencement time and the equipment operation settings are determined based on minimized energy usage by the equipment.

8. A method of operating equipment of a water-circulation system of a swimming pool or spa, comprising:
   a. receiving information as to a desired temperature of water within the swimming pool or spa and a desired time or timeframe at which the water is desired to be at the desired temperature;
   b. accessing additional information related to historical weather data for a geographic location of the swimming pool or spa, current weather data for the geographic location of the swimming pool or spa, and weather forecasts for the geographic location of the swimming pool or spa;
   c. modeling performance of the equipment based on the desired temperature, the desired time, and the additional information;
   d. determining, based on the modeled performance, (i) a heating commencement time to commence heating of the pool, where the heating commencement time is before the desired time or time frame, and (ii) equipment operation settings while operating;
   e. generating a schedule for operating the equipment before the desired time or time frame, the generated schedule comprising the heating commencement time and the equipment operation settings; and
   f. controlling the equipment pursuant to the generated schedule to commence heating at the heating commencement time and to operate pursuant to the equipment operation settings from the heating commencement time to the desired time or timeframe control a temperature of the water in an attempt to cause the water to reach the desired temperature at the desired time or timeframe.

* * * * *